(12) United States Patent
Debolt

(10) Patent No.: US 11,818,111 B1
(45) Date of Patent: Nov. 14, 2023

(54) SYSTEMS AND METHODS FOR SEARCH ENGINE BASED WEB TICKET MINIMIZATION

(71) Applicant: ARCHITECTURE TECHNOLOGY CORPORATION, Eden Prairie, MN (US)

(72) Inventor: Ryan Debolt, Eden Prairie, MN (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 607 days.

(21) Appl. No.: 16/654,888

(22) Filed: Oct. 16, 2019

(51) Int. Cl.
*H04L 9/40* (2022.01)
*G06F 16/9535* (2019.01)
*G06N 3/006* (2023.01)
*G06N 20/00* (2019.01)
*G06F 9/451* (2018.01)

(52) U.S. Cl.
CPC .............. *H04L 63/08* (2013.01); *G06F 9/453* (2018.02); *G06F 16/9535* (2019.01); *G06N 3/006* (2013.01); *G06N 20/00* (2019.01)

(58) Field of Classification Search
CPC ..... H04L 63/08; G06F 9/453; G06F 16/9535; G06N 3/006; G06N 20/00
See application file for complete search history.

(56) References Cited

U.S. PATENT DOCUMENTS

| | | | | |
|---|---|---|---|---|
| 8,341,167 | B1* | 12/2012 | Podgorny | G06F 16/90332 707/758 |
| 2002/0078230 | A1* | 6/2002 | Hals | G06F 16/9535 707/E17.109 |
| 2006/0277220 | A1* | 12/2006 | Patrick | G06F 21/6227 |
| 2007/0094171 | A1* | 4/2007 | Burges | G06N 3/08 706/16 |
| 2007/0208744 | A1* | 9/2007 | Krishnaprasad | H04L 63/083 707/999.009 |
| 2014/0366158 | A1* | 12/2014 | Han | G06F 21/32 726/28 |

OTHER PUBLICATIONS

ATC-NY, Topic: N183-143, N183-143-0033, Phase 1 SBIR Proposal, Title: Machine Learning to Enhance Navy Service Desk, Proposal Author: Ryan Debolt.

* cited by examiner

*Primary Examiner* — Pei Yong Weng
(74) *Attorney, Agent, or Firm* — FOLEY & LARDNER LLP

(57) ABSTRACT

Various embodiments described herein relate to a system for providing automated solutions, in response to a query of a user. The system may include a search engine-based web service, which may receive information from a database and may enable the user to troubleshoot their query. The search engine-based web service may include an artificial intelligence based chat service. The user may use the artificial intelligence based chat service to submit the query. In response, an intelligent virtual assistant of the artificial intelligence based chat service may process the query and return the solutions from the database, which may be appropriately related to subject matter of the query.

20 Claims, 5 Drawing Sheets

SYSTEMS AND METHODS FOR SEARCH ENGINE BASED WEB TICKET MINIMIZATION

TECHNICAL FIELD

This application relates generally to systems, apparatus, and methods for search engine based web ticket minimization.

BACKGROUND

Information technology infrastructures are incredibly complex containing multiple nodes and multiple communication links. Furthermore, different nodes within an infrastructure may be performing different types of operations executing specialized software packages. Such complexity inevitability lends itself to error conditions that have to be resolved in a short order. These error conditions are generally resolved through a web-based ticket system.

A conventional web-based ticket system utilizes a ticket queue. A node may automatically generate a ticket for an error condition or an operator of the node may manually generate a ticket, which then may be placed on the ticket queue for a resolution. A helpdesk may access the ticket queue and the resolve the error conditions associated with the web based tickets accordingly.

However, the conventional ticket queue based systems have several technical shortcomings, especially for information technology infrastructures with different levels of authentication (e.g., hierarchical authentication). For example, each and every web-based ticket is placed on a ticket queue. The only additional feature provided by a ticket queue based system is to allow a node or an operator of the node to tag a web-based ticket as urgent. Regardless of the urgency of each web-based ticket, the ticket queue may overload the helpdesk and resources associated with the helpdesk. Furthermore, a conventional helpdesk also provides information without regard to the different levels of authentication. For example, a conventional helpdesk does not have a filter as to the information provided back to a node or its operator based upon a corresponding authentication level.

As such, a significant improvement upon web-based tickets within an infrastructure technology infrastructure is therefore desired.

SUMMARY

What is therefore desired are systems and methods that may provide automatic and filtered responses to web-based tickets within an information technology infrastructure. An illustrative system may include a search engine-based web service, which may receive information from a database and may enable an operator (also referred to as a user) to troubleshoot an error condition. The search engine-based web service may process a query associated with an error condition and return the filtered solutions from a database. As an example, the filtered solution may be in form of a web document with one or more portions redacted based upon the authentication level of the user. The search engine-based web service may include an artificial intelligence based chat service configured to receive a query from a user. In response, an intelligent virtual assistant of the artificial intelligence based chat service may process the query and return the filtered solutions. The intelligent virtual assistant may utilize a machine learning model to process the query and find the solutions from the database. The system may train the machine learning model to adjust the results based on a type of incoming query traffic. The machine learning model may detect patterns based on the type of the incoming query traffic and make predictions of upcoming queries from various users.

In one embodiment, a server-implemented method may include generating, by a server, an authenticated session based upon authentication credentials associated with a user operating a user device, the authentication credentials corresponding to a first level of authentication; receiving, by the server, a text-based query entered in a web portal in the authenticated session from the user device; parsing, by the server, the text-based query to determine one or more relevant keywords based upon one or more predetermined rules; executing, by the server, a machine learning model to retrieve one or more web documents based upon the one or more relevant keywords, wherein the one or more web documents are associated with a plurality of levels of authentication; filtering, by the server, the one or more web documents to generate a filtered set of web documents based upon the authentication credentials associated with the user, wherein the filtering redacts a portion of at least one web document; and providing for display, by the server to the user device, the filtered set of web documents.

In another embodiment, a system comprises a non-transitory storage medium storing a plurality of web documents; and a server configured to: generate an authenticated session based upon authentication credentials associated with a user operating a user device, the authentication credentials corresponding to a first level of authentication; receive a text-based query entered in a web portal in the authenticated session from the user device; parse the text-based query to determine one or more relevant keywords based upon one or more predetermined rules; execute a machine learning model to retrieve one or more web documents from the non-transitory storage medium based upon the one or more relevant keywords, wherein the one or more web documents are associated with a plurality of levels of authentication; filter the one or more web documents to generate a filtered set of web documents based upon the authentication credentials associated with the user, wherein the filtering redacts a portion of at least one web document; and provide for display to the user device, the filtered set of web documents.

BRIEF DESCRIPTION OF THE DRAWINGS

Non-limiting embodiments of present disclosure are described by way of example with reference to accompanying figures, which are schematic and are not intended to be drawn to scale. Unless indicated as representing background art, the figures represent aspects of the present disclosure.

DETAILED DESCRIPTION

Figure 1A:
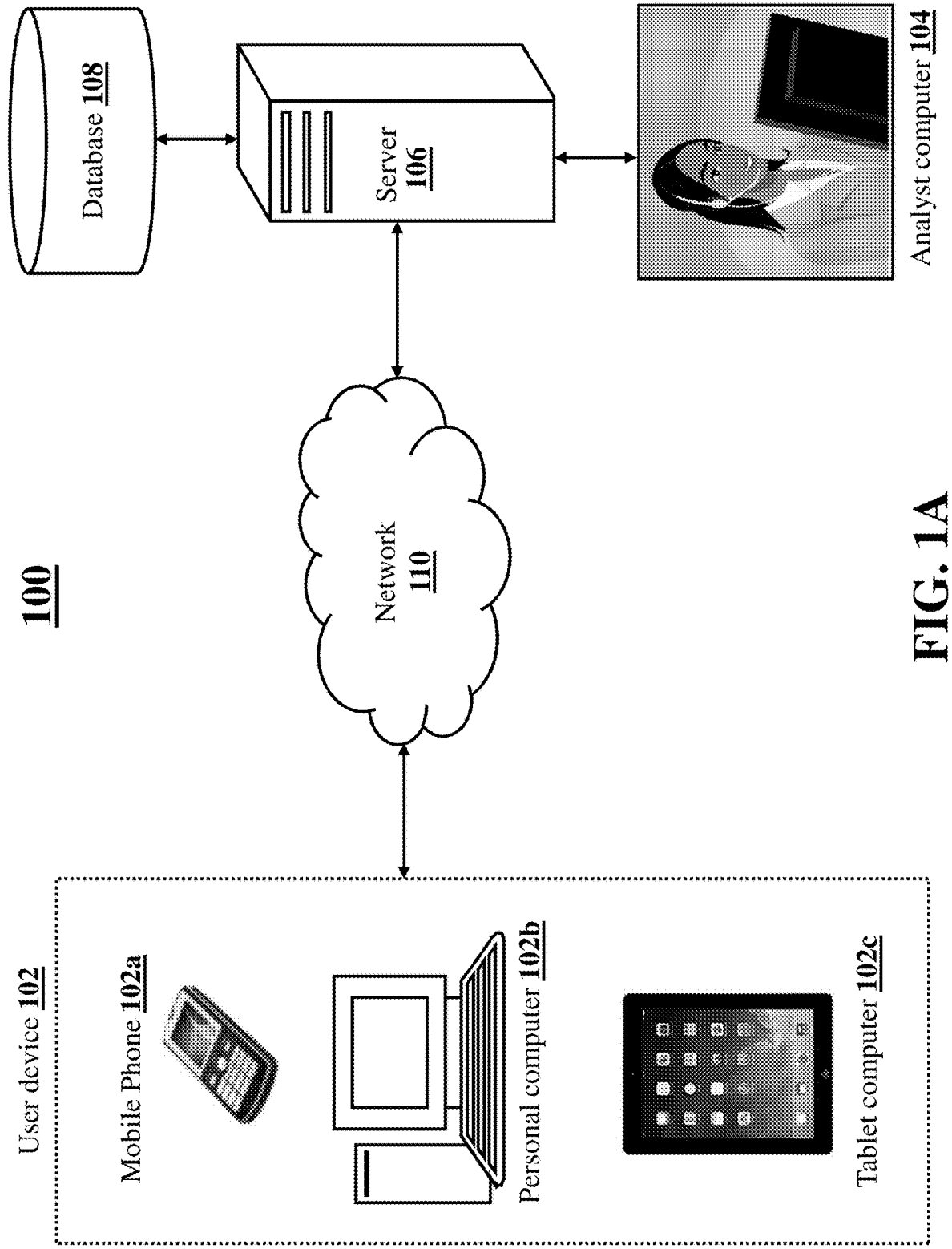
FIG. 1A illustrates an example of a system configured to initiate an electronic communication session via a communication application, according to an embodiment.

The present disclosure is here described in detail with reference to embodiments illustrated in the drawings, which form a part here. Other embodiments may be used and/or other changes may be made without departing from the spirit or scope of the present disclosure. The embodiments described in the detailed description are not meant to be limiting of the subject matter presented here.

Reference will now be made to the embodiments illustrated in the drawings, and specific language will be used herein to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein.

A helpdesk system within an information technology infrastructure may include a web portal having a web service. The web service may be a computer-based communication application. Multiple electronic and computing devices may execute the web service to communicate with each other via a world wide web. The web service may include an interface, which may have a search engine. The web service may further include a communication channel, such as a chat bot application. The web service may directly connect the search engine and the chat bot application with a database. The user using the search engine and the chat bot application to submit questions associated with error conditions may receive answers to their questions directly from the database and without any human intervention, which may minimize web-based ticket (also referred to as ticket) traffic to an analyst.

An intelligent virtual assistant associated with the search engine and the chat bot application may perform tasks for the user based on analysis of information within the questions associated with the error conditions. The tasks may include searching for the answers in the database to the questions of the user. The virtual assistant may act as an interface between the user and the answers stored in the database. The virtual assistant may embody a human representative of a web service provider. The virtual assistant may act as an effective interface that allows the user to seek the answers while still allowing the web service provider to realize cost savings associated with providing the answers online rather than via a human representative, such as the analyst.

When the user uses the chat bot application on a user device to submit a problem containing one or more questions, a backend server associated with the chat bot application may execute a machine learning model to search the database. The machine learning model may receive one or more relevant keywords from the one or more questions as an input. The machine learning model may identify one or more web documents from the database. The one or more web documents may include data records, which may be associated with subject matter within the one or more questions. The data records in the one or more web documents may include appropriate answers to the one or more questions. The one or more web documents may further include a frequently asked questions (FAQ) document, which may assist the user to solve their problem quickly, and without the need of the analyst operating a service desk. A display screen of the user device may show the one or more web documents, which may be received from the backend server.

The chat bot application may continually learn using artificial intelligence techniques including machine learning. The chat bot application may be directly or indirectly associated with the database and the machine learning model. The machine learning model may be able to train itself using training dataset, and adjust output search results based on a type of incoming request traffic it receives from various users. The output search results may change over time as when the users make searches and results are selected by the user, the more times a particular result is selected by the user, the higher on the list the particular result will sit for the keywords used in a new search query. In addition, the database may be continually updated with new resources, which may be used to generate an updated training dataset. The machine learning model may retrain itself using the updated training dataset. This may enable the machine learning model to automatically gather new information from the new resources and use this new information in the output search results to keep the output search results as up to date as possible.

The system described herein may include multiple features and characteristics. For instance, the system may provide the web service having an ability to search the database based on meaning and context of communications (text and speech) with the user, reports, and logs. The system may include features, such as user search, email, chat, and browsing history to guide and enhance current search results based on an input query from the user. The system may be configured to promote search results that other users selected when entering similar search criteria to current user's query. The system may be configured to promote the search results for emergent, common issues when several other users enter similar search queries, predicting instantaneous recently-arisen, widespread trends in user searches. The system may be configured to provide an ability to communicate with the user via bots (e-mail or chat).

The system may be configured to automatically respond to end users emails or chats describing their problems with most likely solutions to resulting tickets, closing the tickets, when appropriate, and without human involvement. The system may be configured to automatically link the user to a FAQ page that is known to address the problem the user may be encountering. The system may be configured to automatically identify, retrieve, and pre-populate electronic forms the user may need to submit to address the problem at hand.

The system may provide an ability to predict future workloads and resource utilization, allowing routine information technology (IT) support tasks to be enhanced by automation by supplementing (not replacing) service desk (also referred to as helpdesk) analysts. The system may be configured to pre-populate emails and various communication forms, from help desk personnel to end-users, with the text and other multimedia content that has successfully addressed the same problem in the past. The system may be configured to search IT service logs and content to determine the most likely cause(s) of the problem of the user, and display historically-known solutions (with supplementary information) to the analyst who then selects an appropriate option.

The system may be configured to provide an ability to automate routing and workflow of new problems to the appropriate analyst or electronic resource to meet end-user expressed needs, based on an understanding of the meaning and context of the problem, past successes (with similar problems), and an availability of different support resources. The system may be configured to provide an ability to predict future IT service trends by predicting demand for new/existing IT services, or the future levels of analyst needed and entailing. The system may be configured to predict upcoming spikes in resource utilization that will require extended labor demands, expanded electronic resources utilization, etc. The system may be configured to employ predictive analytics to predict future levels of user satisfaction based on past impact of various contributory variables. The system may be configured to crawl online web for upcoming security technical implementation guides (STIG) or STIGs that will likely impact operations.

The system may also filter the generated results based upon the authentication credentials associated with the requesting user (i.e., a web-based ticket generator). For example, the system may retrieve a web document in response to a query. Before presenting the web document for display, the system may redact one or more portions of the web document based upon the authentication credentials of the requesting user. For example, the web document may include classified information that may require a higher level of authentication compared to that of the requesting user and the system may redact the classified information prior to providing the same to the requesting user.

Figure 1B:
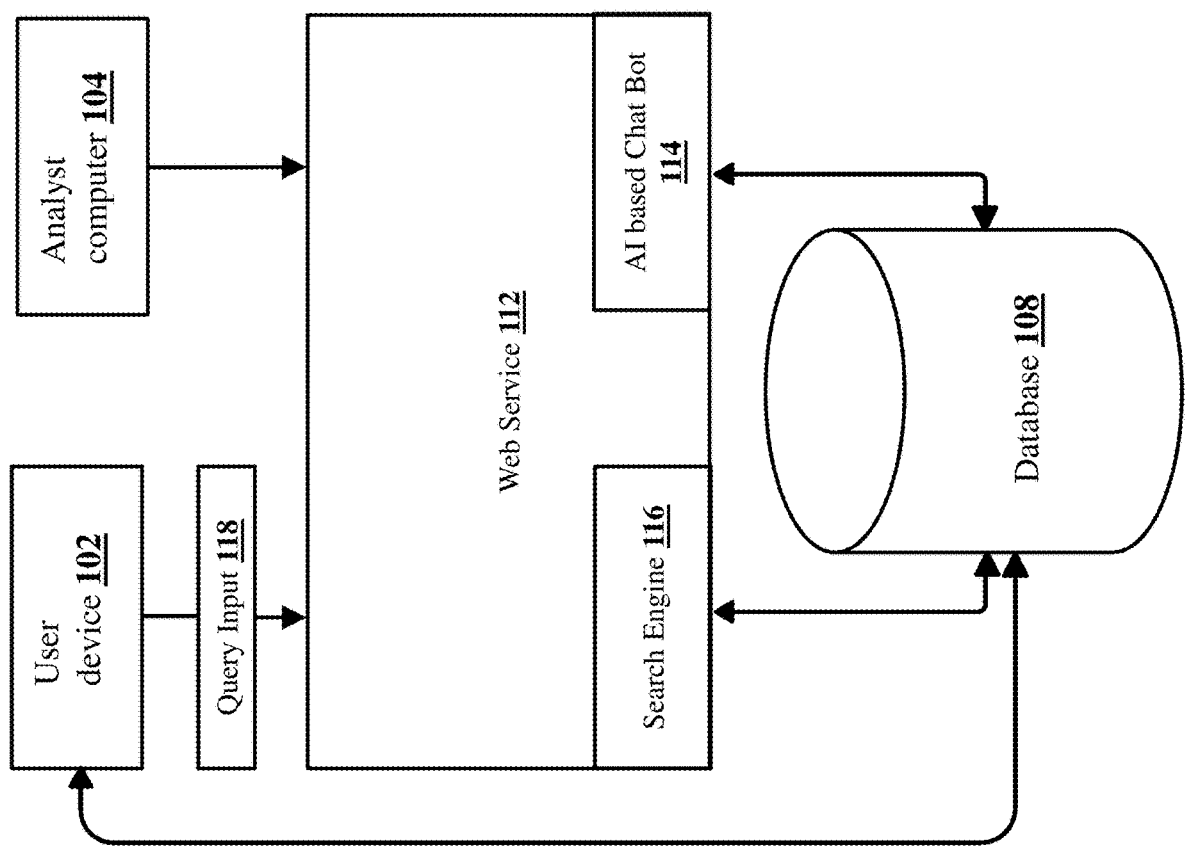
FIG. 1B illustrates network connections associated with a system configured to initiate an electronic communication session via a communication application, according to an embodiment.

FIGS. 1A and 1B illustrate an example of a system 100 operated by a customer assistance center (e.g., a service desk or helpdesk) within an information technology infrastructure of an enterprise. Non-limiting examples of the enterprise may include a federal agency, a software company, a retail company, and a professional services company. The system 100 may include various devices, such as a user device 102 operated by a user (for example, a customer of the enterprise), an analyst computer 104 operated by an analyst (for example, a customer service professional of the enterprise), a server 106, and a database 108. Non-limiting examples of the user device 102 include a mobile phone 102a, personal computer 102b, and a table computer 102c.

The system 100 is described in a context of computer-executable instructions, such as program modules, being executed by server computers, such as the server 106. The server 106 may operate various software programs and applications, such as a communication application. The user device 102 may install and execute the communication application. The communication application may include a first set of programs, objects, components, data structures, etc., which may perform particular tasks. The analyst computer 104 may install and execute the communication application. The communication application in the analyst computer 104 may include a second set of programs, objects, components, data structures, etc., which may perform particular tasks. The features of the system 100 may be practiced either in a single computing device, or in a distributed computing environment, where various tasks may be performed by processing devices, which are linked through a network 110. In the distributed computing environment, the various program modules may be located in both local and remote computer storage media including memory storage devices.

As described above, the user device 102, the analyst computer 104, the server 106, the database 108, and various other devices of the system 100 may communicate with each other over the network 110. The network 110 may include, but is not limited to, a private or public local area network, a wireless local area network, a metropolitan area network, a wide-area network, and Internet. The network 110 may further include both wired and wireless communications according to one or more standards via one or more transport mediums. The communication over the network 110 is in accordance with various communication protocols, such as transmission control protocol, internet protocol, user datagram protocol, and institute of electrical and electronics engineers communication protocols. The network 110 may further include wireless communications according to Bluetooth specification sets, or another standard or proprietary wireless communication protocol. The network 110 may further include communications over a cellular network, including, for example, a global system for mobile communications, code division multiple access, and enhanced data for global evolution network. The network 110 may further include hardware devices (e.g., routers, switches, firewalls) and software components configured to relay data communications between different computing devices and software applications associated with the system 100.

During operation of a first embodiment of the system 100, the user using the user device 102 may desire to access a service (for example, a customer help service). The user device 102 may execute a web service 112, such as a communication application running on the user device 102. The user device 102 may execute instructions to connect with the server 106 via one or more communication channels (for example, AI based chat bot 114, a voice call, etc.) available on the communication application over the network 110 to start an electronic communication session. The server 106 may receive a request for the electronic communication session from the user device 102 via the communication application. The server 106 may accept the request for the electronic communication session received from the user device 102. When the electronic communication session is started over a first communication channel (for example, the AI based chat bot 114), the server 106 may authenticate the user of the user device 102. A first step of the user authentication may include obtaining information, such as a unique device identifier associated with the user device 102 that can be used to determine a user profile of the user. The server 106 may determine the unique device identifier and then use the unique device identifier to retrieve the user profile of the user from the database 108. The user profile may include a user name and a user identifier.

The server 106 may select a first authentication question from the database 108 based on the user profile for verification of an identity of the user. The first authentication question may be a question related to non-personal information associated with the user (for example, a name of a first music concert attended by the user). The server 106 may select a second authentication question from the database 108 based on the user profile for the verification of the identity of the user. The second authentication question may be a question related to personal information associated with the user (for example, a social security number of the user).

The server 106 may present an authentication question (for example, the first authentication question, the second authentication question, or any other authentication question) on a graphical user interface of the user device 102. The user device 102 may receive the authentication question. The user device 102 may transmit an answer to the authentication question to the server 106. The server 106 may execute a comparison protocol to compare the answer received from the user device 102 with a predetermined answer to the authentication question stored in the database 108. When the answer received from the user device 102 matches the predetermined answer, the server 106 may authenticate the user. The server 106 may provide the services to the user device 102 when the user is successfully authenticated.

During the electronic communication session, information may be exchanged in real time between the user device 102 and an intelligent virtual assistant operated by the server 106. The information may include a query input 118 received from the user device 102. The query input 118 may include textual, audible, and/or visual content. The server 106 may convert all content in the query input 118 into a text format. The server 106 may parse the content. The server 106 may determine one or more relevant keywords from the content. The server 106 may execute a machine learning model using the one or more relevant keywords as an input to retrieve one or more web documents from the database 108. The server 106 may select a subset of web documents from the one or more web documents based on analysis of information within the user profile. The subset of web documents may include an answer to a question within the query input 118.

The server 106 may transmit the subset of web documents to the user device 102 via the AI based chat bot 116 during the electronic communication session. In some instances, the server 106 may transmit the subset of web documents to the user device 102 via another communication channel (for example, an email notification) during the electronic communication session. The user device 102 may receive the subset of web documents. The user device 102 may review the information within the subset of web documents.

During operation of a second embodiment of the system 100, the user using the user device 102 may desire to access the service from the analyst operating the analyst computer 104. The user device 102 and the analyst computer 104 may execute the web service 112, such as the communication application. The user device 102 may execute instructions to connect with the analyst computer 104 via the one or more communication channels (for example, the AI based chat bot 116, the voice call, etc.) available on the communication application over the network 110 to start the electronic communication session. The analyst computer 104 may receive the request for the electronic communication session from the user device 102 via the communication application running on the analyst computer 104. The analyst computer 104 may accept the request for the electronic communication session received from the user device 102. When the electronic communication session is started over the first communication channel (for example, the AI based chat bot 116), the analyst computer 104 via the server 106 may authenticate the user of the user device 102. The analyst computer 104 may provide the services to the user device 102 when the user is successfully authenticated.

The information may be exchanged in real time between the user device 102 and the analyst computer 104 during the electronic communication session. The information may include the query input 118 received from the user device 102. The analyst computer 104 may transmit the query input 118 to the server 106. The server 106 may parse the query input 118. The server 106 may determine the one or more relevant keywords from the query input 118. The server 106 may execute the machine learning model using the one or more relevant keywords as the input to retrieve the one or more web documents from the database 108. The server 106 may determine the subset of web documents from the one or more web documents for the user based on the user profile. The subset of web documents may include the answer to the question in the query input 118.

The server 106 may present the subset of web documents on a graphical user interface of the analyst computer 104. The analyst computer 104 may transmit the subset of web documents to the user device 102 via the AI based chat bot 116 during the electronic communication session. In some instances, the analyst computer 104 may communicate the subset of web documents to the user device 102 via another communication channel (for example, the email notification) during the electronic communication session. The user device 102 may receive the subset of web documents. The user device 102 may review the information within the subset of web documents.

In one instance, the user may use the user device 102 to initiate an electronic communication session with the server 106 via one or more communication channels. In another instance, the user may use the user device 102 to initiate the electronic communication session with the analyst computer 104 via the one or more communication channels. The electronic communication session may be a messaging session. The electronic communication session may be a chat session. The electronic communication session may be a voice call session. The communication channels may host data communications between the user device 102 and the server 106, as well as between the user device 102 and the analyst computer 104. The data communications may be any real time data transfer between the user device 102 and the server 106, as well as between the user device 102 and the analyst computer 104 capable of communicating text, audio, video, image, multimedia, and other data over the network 110.

The communications channels may be a collection of hardware systems and software applications that may host the data communications of each particular channel. Non-limiting examples of the communications channels may include the AI based chat bot 114, a computer contact channel, a telecommunications channel, among others. In the system 100, the communications channels may be characterized by a nature of the data communications expected for each particular channel. For example, the AI based chat bot 114 may include hardware and software components configured to conduct a real time conversation via auditory or textual methods. The telecommunications data channel may include hardware and software components configured to host the data communications, such as short message service texts and interactive voice response relays and inputs, which are transmitted to the server 106 and/or the analyst computer 104. However, it should be understood that the communication channels may be established based on any criteria for determining which hardware and software components should handle the data communications received from disparate systems and engendered in different formats. As such, the communication channels of the system 100 are merely intended as examples, and additional or alternative communication channels may be included, to support the additional or alternative software applications and hardware devices that would be associated with those additional or alternative communication channels.

The user device 102 may include such as a client-side communication application to communicate with the web service 112. The communication application may include interactive features to interact with AI based chat bot 114 and a search engine 116. The user device 102 may interact with the AI based chat bot 114 to start the electronic communication session and initiate the communication with the server 106 and/or the analyst computer 104. The communication application may be a software stack running on an operating system of the user device 102. In order to access the communication application on the user device 102, the user device 102 may transmit communication application credentials of the user via user inputs to the server 106, from which the server 106 may validate the user. The user device 102 may include a number of input devices (e.g., a keyboard, a touchscreen, and a stylus) to receive the user inputs, including various types of authentication credentials and data inputs allowing for validation, e.g., username, passwords, certificates, biometrics. When the server 106 validates the user, the user may have access to all features, such as the AI based chat bot 114 and the search engine 116 of the communication application running on the user device 102.

The user device 102 may generate and transmit a first request to the server 106, using the AI based chat bot 114 of the communication application, to start the electronic communication session and initiate communication with the virtual assistant associated with the server 106. The first request may include the query input 118. The query input 118 may include one or more questions having textual, audible, and/or visual content. The user device 102 may convert all content in the query input 118 into a text format, which is then transmitted to the server 106. The server 106 may execute a machine learning model to identify solutions, such as the one or more web documents from the database 108, in response to processing of the first request. The user device 102 may receive the solutions via the virtual assistant associated with the server 106.

The user device 102 may generate and transmit a second request to the server 106, using the search engine 116 of the communication application. The second request may include the query input 118. The query input 118 may include one or more queries having textual, audible, and/or visual content. The user device 102 may convert all content in the query input 118 into a text format, which is then transmitted to the server 106. The server 106 may execute the machine learning model to identify the solutions, such as the one or more web documents from the database 108, in response to process of the second request. The user device 102 may receive the solutions via the virtual assistant associated with the server 106.

The user device 102 may generate and transmit a third request to the analyst computer 104, using the communication application, to start the electronic communication session and initiate communication with the analyst computer 104. The third request may include the query input 118. The query input 118 may include the one or more questions having textual, audible, and/or visual content. The user device 102 may convert all content in the query input 118 into a text format, which is then transmitted to the analyst computer 104. The analyst computer 104 may directly or indirectly execute the machine learning model to identify solutions, such as the one or more web documents from the database 108, in response to processing of the third request. The user device 102 may receive the solutions from the analyst of the analyst computer 104.

The user device 102 may include an interactive graphical user interface on which the user may interact with various features, such as the AI based chat bot 114 and the search engine 116 of the communication application by means of the input device. The interactive graphical user interface via the communication application may present notifications and on-screen alerts to the user, which may be received from the server 106 and/or the analyst computer 104. The communication application may display interactive icons or buttons on the interactive graphical user interface. The triggering of the icons may generate a screen having a plurality of portions on the interactive graphical user interface. A first portion of the screen may present a description associated with the notifications and on-screen alerts. The description of the notifications and on-screen alerts may include authentication questions, information associated with an account of the user, answers to the one or more questions in the query input 118, etc. The user, via the user device 102, may transmit a message reply from a second portion of the screen to the server 106 and/or the analyst computer 104 in response to the notifications and on-screen alerts. The second portion of the screen may provide a brief text box (for example, a text box with a pre-defined number of characters) having an expandable text capture capability to capture user's explanation of the message reply to the notifications and on-screen alerts. The message reply may include an answer to the authentication question, new queries, etc.

The server 106 may generate a contact record, in response to receiving data communications through the communication channel, such as the AI based chat bot 114 enabling the electronic communication session with the user device 102. In another embodiment, the server 106 may generate the contact record, in response to receiving the data communications through the communication channel, such as the AI based chat bot 114 enabling the electronic communication session between the user device 102 and the analyst computer 104. The contact record may indicate a party (e.g., the user) who initiated the contact via a text-based chat or some other medium on the communication channel, as well as other information related to the contact (e.g., a time, a date, and a type of the communication channel). The server 106 may automatically generate the contact record when the data communication received through the communication channel is detected in a queue associated with the virtual assistant associated with the server 106. In another embodiment, the server 106 may automatically generate the contact record when the data communication received through the communication channel is detected in the queue associated with the analyst operating the analyst computer 104. The server 106 may store the contact record in the database 108.

The server 106 may receive a data record directly from the user device 102 prior to beginning of the electronic communication session or during the electronic communication session. In another embodiment, the server 106 may receive the data record indirectly from the user device 102, for example, via the analyst computer 104 during the electronic communication session. In yet another embodiment, the server 106 may generate and execute a request to obtain the data record from the user device 102 during the electronic communication session. The data record may include at least the unique device identifier associated with the user device 102, among other information associated with the user device 102. The server 106 may store the data record received from the user device 102 or the analyst computer 104 in the database 108. The unique device identifier associated with the user device 102 may be a phone number of the user device 102. The unique device identifier associated with the user device 102 may be a unique device identification number of the user device 102. The unique device identifier associated with the user device 102 may be a model number of the user device 102. The unique device identifier associated with the user device 102 may be a serial number of the user device 102. The unique device identifier associated with the user device 102 may be IMEI number of the user device 102. The unique device identifier associated with the user device 102 may be an account number of the user. The unique device identifier associated with the user device 102 may be an email address of the user.

The server 106 may retrieve a user profile of the user operating the user device 102 from the database 108 using the unique device identifier. The user profile may include information associated with the user, such as a name of the user, an age of the user, a gender of the user, occupation records of the user, transaction records of the user, hobbies of the user, personal interests of the user, verification preferences of the user, and social networking accounts of the user.

The server 106 may determine browsing history of the user on the user device 102 for a predetermined period of time using the communicating application running on the user device 102. The server 106 may also determine the browsing history of the user on one or more computing devices, which are wired or wirelessly linked to the user device 102 for the predetermined period of time. The server 106 may transmit instructions to a webserver to determine and transmit the browsing history of the user on the user device 102 and other computing devices for the predetermined period of time. The webserver may determine a list of websites being accessed by the user on the user device 102 and other computing devices over the predetermined period of time. The webserver may further determine a list of items being searched by the user on various websites over the predetermined period of time. The webserver may further determine a list of articles being read by the user on various websites over the predetermined period of time. The webserver may process the information associated with the list of the items, the list of the articles, and the list of the websites to generate a research history report corresponding to the user. The webserver may transmit the research history report to the server 106. The server 106 may store the research history report within the user profile of the user.

The server 106 may execute one or more authentication algorithms to process the information within the user profile to generate one or more authentication questions for verification of an identity of the user at the start of the electronic communication session. The server 106 may generate the authentication question related to sensitive or non-sensitive information of the user. The sensitive information of the user may include an account number, a passport number, and a social security number of the user. The non-sensitive information of the user may include a name of a high school of the user.

The server 106 may directly transmit the one or more authentication questions selected for performing the authentication of the user to the user device 102 during the electronic communication session. In some embodiments, the server 106 may transmit the one or more authentication questions selected for performing the authentication of the user to the user device 102 via the analyst computer 104 during the electronic communication session. The server 106 may receive answers for the one or more authentication questions from the user device 102. In some embodiments, the server 106 may receive the answers for the one or more authentication questions obtained from the user device 102 via the analyst computer 104. After receiving the answers, the server 106 may match the answers provided by the user for the one or more authentication questions with answers to a same set of one or more authentication questions previously provided by the user, which are presently stored in the database 108. The server 106 may authenticate the user based upon determining that current answers provided by the user for the one or more authentication questions matches with the previously provided and verified answers by the user for the same set of one or more authentication questions. In some embodiments, the server 106 may present a result of the authentication of the user on the graphical user interface of the analyst computer 104 during the electronic communication session.

The server 106 may record conversations, such as text chats, audio calls, and video calls with the user device 102 during the electronic communication session. In some embodiments, the server 106 may record conversations, such as the text chats, audio calls, and video calls between the user device 102 and the analyst computer 104 during the electronic communication session. The text chats, audio calls, and video calls may include the query input 118 of the user. The text chats, audio calls, and video calls may include answers provided to the user, in response to the query input 118. The server 106 may store the conversations in the database 108 together with data presented on the graphical user interface of the user device 102. In some embodiments, while all the conversations with the user device 102 may be recorded in their entirety, the server 106 may only store a small portion of the conversations in the database 108 to save space in the database 108. The server 106 may subsequently review only a portion of the conversations stored in the database 108 to determine the query input 118 of the user. The server 106 may also review any data entered by the user through a key pad on the user device 102 during the electronic communication session to determine the query input 118 of the user.

The server 106 may execute one or more parsing protocols to parse content of one or more questions in the query input 118 of the user. Based on the parsing, the server 106 may determine one or more relevant keywords from the one or more questions based upon one or more predetermined rules. The one or more predetermined rules may include a first rule, a second rule, a third rule, among others. The first rule may be to select a relevant keyword from the query input 118 based on a number of times the relevant keyword is used in the query input 118. The second rule may be to select a relevant keyword from the query input 118 based on a meaning and context of the relevant keyword in the query input 118. The third rule may be to select a relevant keyword from the query input 118 based on a type of content in the query input 118. Upon selecting the one or more relevant keywords from the query input 118 based upon the one or more predetermined rules, the server 106 may store a record of the one or more relevant keywords in the database 108.

The server 106 may execute a machine learning model, using the record of the one or more relevant keywords as an input, to search the database 108 and retrieve most appropriate one or more web documents from the database 108 directly or indirectly associated with the one or more relevant keywords. The one or more web documents may be associated with a plurality of levels of authentication. The plurality of levels of authentication may include a first level of authentication, a second level of authentication, etc. The first level of authentication may be associated with admin level employees. The second level of authentication may be associated with management level employees.

The server 106 may generate the machine learning model using logistic regression and gradient boosting tree. The machine learning model may include one or more statistical models, such as, weighted least square regression model, gradient boosting regression model, and gradient boosting classification model. In some embodiments, the machine learning model may include a neural network. The neural network may include an interconnected group of artificial neurons, which may be represented by sample keywords, sample questions, and sample web documents. The machine learning model may represent a mathematical model, which may include mathematical functions describing a relationship between each neuron within the neural network using weight and bias factors. The machine learning model may include, but not limited to, a mathematical function describing how the neurons are divided into one or more layers. The server 106 may use and execute the machine learning model to search for the one or more web documents in the database 108, in response to receiving the one or more questions in the query input 118 of the user.

The server 106 may train the machine learning model using a training dataset. The training dataset may include a relationship between the sample questions, the sample keywords, and the sample web documents. The server 106 may normalize the sample questions, the sample keywords, and the sample web documents using one or more normalization algorithms. The server 106 may aggregate the sample questions, the sample keywords, and the sample web documents using one or more aggregation algorithms. The server 106 may store normalized and aggregated records of the sample questions, the sample keywords, and the sample web documents in the training dataset.

The server 106 may continuously update the training dataset by including new sample questions, new sample keywords, and new web documents in the training dataset. The server 106 may continuously update the relationship between all sample questions, all sample keywords, and all web documents in the training dataset based on past performance. The server 106 may normalize and aggregate the sample questions, the sample keywords, and the web documents in an updated training dataset. The server 106 may continuously re-train the machine learning model using the updated training dataset. For instance, the machine learning model may use a back-propagation method to reconfigure the mathematical functions (e.g., weight and bias factors), and revise itself to account for new information in the updated training dataset. The machine learning model may never be complete, and may be iteratively trained each time the training dataset is updated. The server 106 may use a variety of methods to train and re-train the machine learning model, such as, evolutionary algorithm methods, simulated annealing methods, expectation-maximization methods, and non-parametric methods.

The server 106 may execute a filtering algorithm to filter the one or more web documents based upon the authentication credentials associated with the user. The one or more web documents may be directly or indirectly associated with the one or more relevant keywords included in the query input 118. In one non-limiting example, the one or more web documents may include a first web document and a second web document. The authentication credentials associated with the user may indicate the first level of authentication of the user. The first level of authentication may be associated with the admin level employees. The admin level employees may not have a top security clearance, and therefore sensitive information may not be shared with them. The server 106 may analyze each of the one or more web documents. Based on the analysis, the server 106 may determine that the second web document has some sensitive information. Using the filtering algorithm and based on the analysis, the server 106 may generate a filtered set of web documents from the one or more web documents. The filtered set of web documents may only include the first web document as the server 106 may remove the second web document because of the presence of the sensitive information within the second web document. In some embodiments, the filtered set of web documents may include the first web document and a redacted version of the second web document. In the redacted version of the second web document, the server 106 may remove the portions from second web document that may include the sensitive information. The server 106 may directly or indirectly present the filtered set of web documents on the user interface of the user device 102, in response to the query input 118 of the user.

The analyst computer 104 may receive records of incoming queries and requests, such as incoming message requests and incoming call requests sent from the user device 102 via the server 106 based on a subject matter (e.g., a type of a request) or a procedural role (e.g., a time-sensitive request) associated with respective analyst operating the analyst computer 104. The analyst computer 104 may receive records of the incoming requests on the communication application running on its operating system. In some implementations, the records of the incoming requests may have one data field indicating a nature of the request and a second data field indicating a time-sensitive nature or a user-sensitive nature of the request. Based on the data fields associated with the records of the incoming requests, the analyst computer 104 may receive the records of the incoming requests having subject matter or procedural data fields associated with respective analyst credentials. The server 106 may store the records of the incoming requests in a queue associated with the analyst.

The analyst computer 104 may include one or more input and output devices, which may allow the analyst to process and accept the incoming requests received on the communication application from the user device 102. The incoming requests may at least include the query input 118 of the user. The analyst computer 104 may execute a query management application associated with communication application, which may allow the analyst to select a record associated with the incoming requests from the queue that is assigned to the analyst, and then review or update underlying information associated with the record. The underlying information may include the user identifier and the one or more questions.

The analyst computer 104 may select a first record of a first request assigned to the analyst computer 104 from the queue of the analyst, which may be having a highest priority among records of all other incoming requests within the queue that are assigned to the analyst computer 104. The server 106 may assign a priority score to each incoming request for the analyst based on information in the user profile associated with, for example, a phone number of each incoming request. The priority score may prioritize the records of the different incoming requests within the queue of the analyst. The priority score of the records of the incoming requests may be continually updated, and thus the prioritization of the incoming requests within the queue. Based on the priority score associated with each incoming request, the analyst computer 104 may present the analyst with the record of the first incoming request, which has to be addressed first.

In some instances, the analyst computer 104 may directly or indirectly parse the query input 118 to determine the one or more questions. Based on the parsing, the analyst computer 104 may directly or indirectly determine the one or more relevant keywords from the one or more questions. The analyst computer 104 may directly or indirectly execute the machine learning model using the one or more relevant keywords as the input to search the database 108, and retrieve the one or more web documents from the database 108 associated with the one or more relevant keywords. The analyst computer 104 may present the one or more web documents on the user interface of the user device 102, in response to the query input 118 of the user.

A database 108 communicates with the user device 102, the server 106, and the analyst computer 104. The database 108 is capable of storing information in a plain format and an encrypted version. In one embodiment, the database 108 may be in communication with a processor of the server 106 where the processor is capable of executing the various commands of the system 100. The database 108 may be part of the server 106. The database 108 may be a separate component in communication with the server 106. In another embodiment, the database 108 may be in communication with a processor of the analyst computer 104 where the processor is capable of executing the various commands of the system 100. The database 108 may be part of the analyst computer 104. The database 108 may be a separate component in communication with the analyst computer 104.

The database 108 may store multiple web documents and training dataset. The database 108 may further store data records associated with various aspects of application services offered to the users. Non-limiting examples of what may be stored in the database 108 may include user records that may include data fields describing users, e.g., user data, such as user credentials (e.g., username, passwords, biometrics, encryption certificates), user profile, user account data, user roles, or user permissions; document records that may comprise machine-readable computer files (e.g., word processing files), parsed portions of such computer files, or metadata associated with computer files; and application data that may include software instructions or data used by various applications (for example, the query management application and the communication application). The database 108 may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions.

Figure 2A:
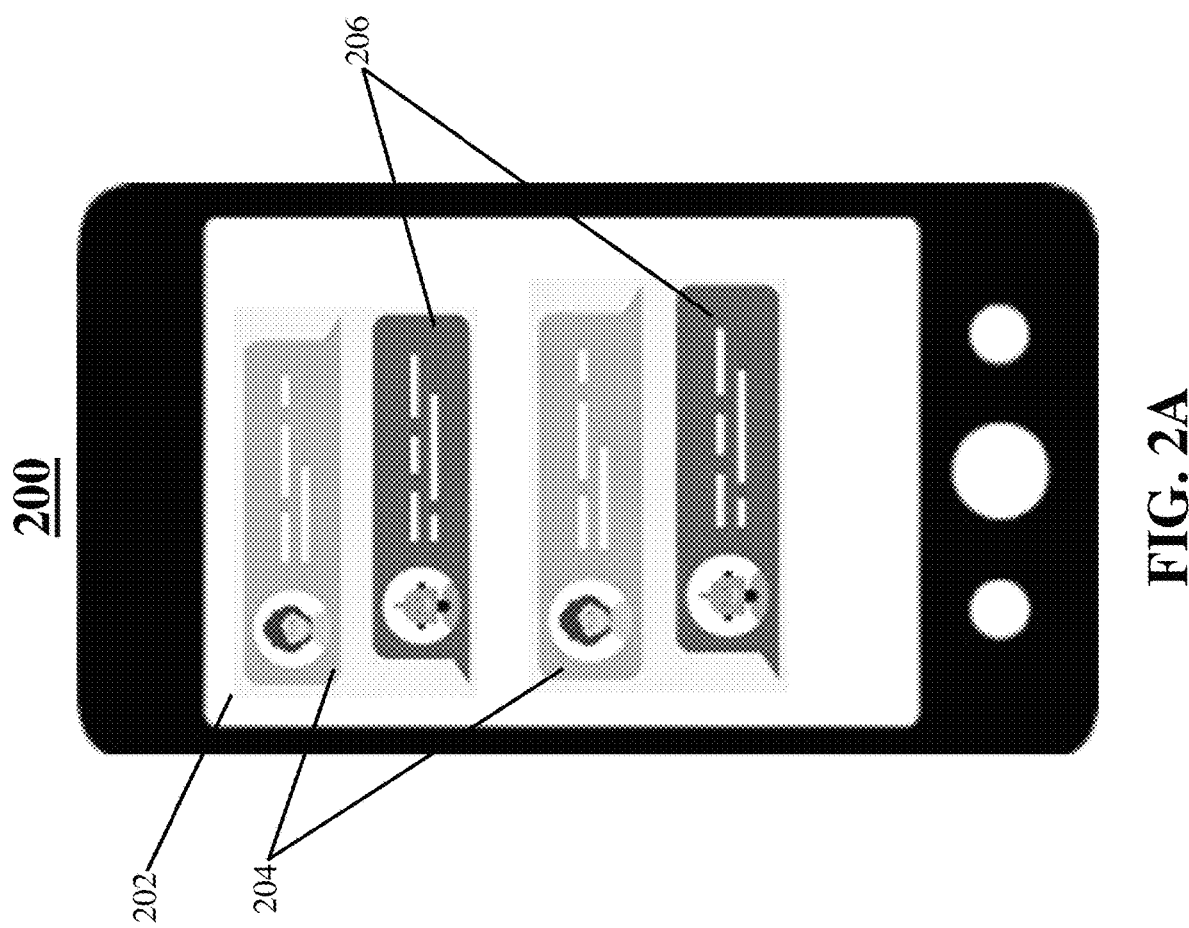
FIG. 2A illustrates a graphical user interface of a user device during an electronic communication session, according to an embodiment.
Figure 2B:
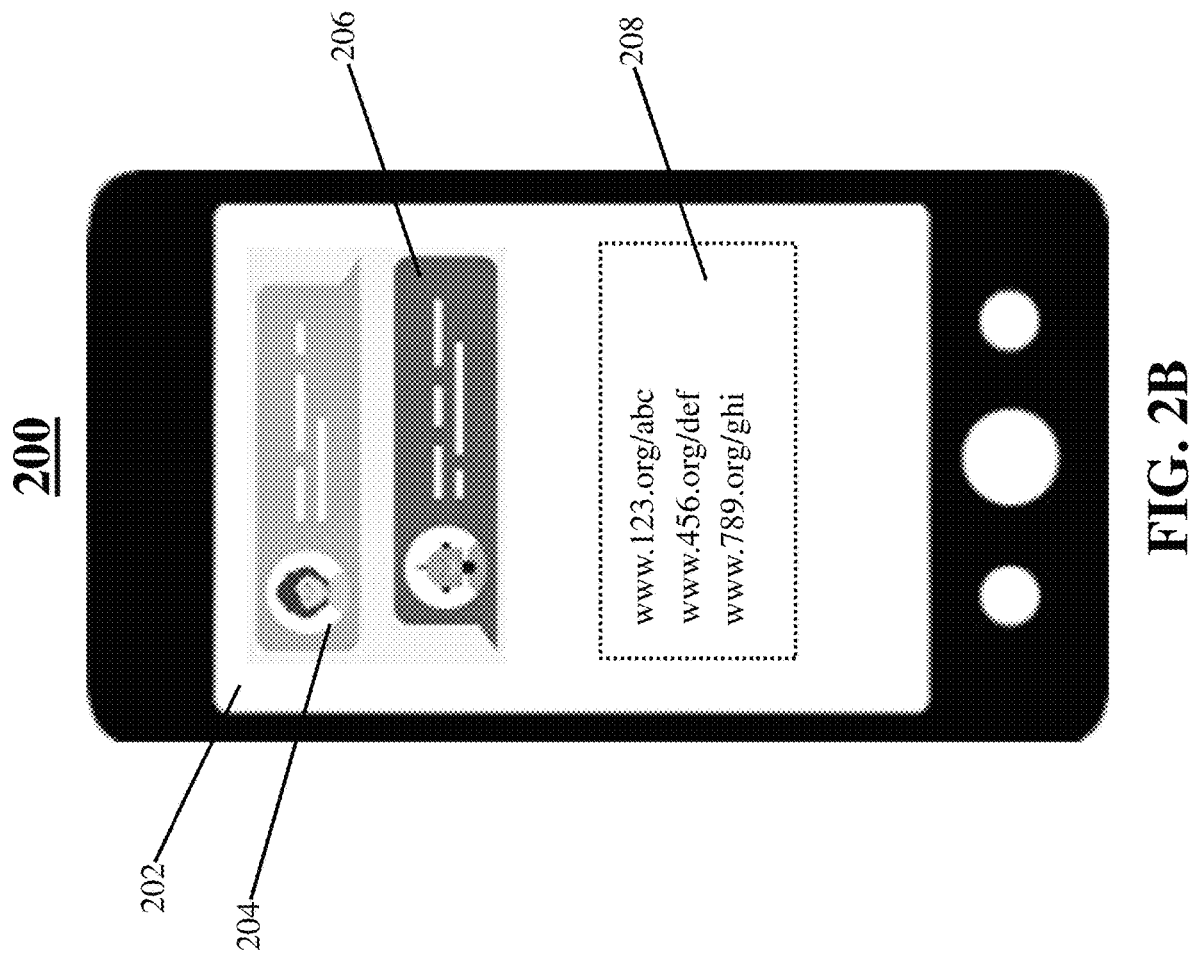
FIG. 2B illustrates a graphical user interface of a user device during an electronic communication session, according to an embodiment.

FIGS. 2A and 2B illustrate a user device 200 operated by a user, according to an embodiment. The user device 200 may be a portable device, such as a smart phone. The user device 200 may include a processor, which may perform one or more operations according to one or more programming instructions. The user device 200 may be capable of communicating with a server and an analyst computer through a communications network using wired or wireless communication capabilities.

The user device 200 may have an interactive graphical user interface 202. The graphical user interface 202 may be a communication interface. The graphical user interface 202 may be a liquid crystal display, a plasma display, a light emitting diode display, an organic light-emitting diode display, an electronic paper display, or any other suitable type of display able to present digital content thereon. The graphical user interface 202 may include a touch sensor associated with graphical user interface 202 to provide a touchscreen display configured to receive touch inputs for enabling interaction with information presented on the graphical user interface 202.

A communication application may be running on the user device 200. The user device 200 may have access to pre-stored web-based interfaces, such as webpages associated with the communication application including a number of preconfigured sub-interfaces or containers, which may be dynamically populated.

The user may access the communication application by a common access method, e.g., keying in a URL, etc. In order to provide access to the communication application, the server may require user verification based upon a set of user credentials (e.g., username, password, biometrics, cryptographic certificate) from the user. Upon the submission of the set of user credentials from the user, the server may authenticate the user based upon the user credentials. The server may generate and serve a webpage of the communication application on the graphical user interface 202 based upon the verification of the user.

The webpage of the communication application shown on the graphical user interface 202 may present multiple communication channels, such as a chat bot to initiate an electronic communication session with the server. The electronic communication session may be a textual chat session. The user may use the chat bot to initiate the textual chat session. Upon the initiation of the textual chat session, information is exchanged between the user and an intelligent virtual assistant associated with the server during the textual chat session. The intelligent virtual assistant may be a software agent that can perform tasks for the user based on questions of the user. The information exchanged between the user and the intelligent virtual assistant may include user text inputs 204, such as the questions from the user. The information may further include virtual assistant text inputs 206. The virtual assistant text inputs 206 may at least include answers 208 for the questions.

The server may parse the information and automatically identify portions of the user text inputs 204 that may include relevant keywords. The server may execute a machine learning model using the relevant keywords as an input to search a database, and automatically generate most appropriate responses to the questions within the user text inputs 204. The responses may include the answers 208 for the questions. The answers 208 may include one or more web documents identified in the database. The server may edit the one or more web documents based on a user profile. For instance, any sensitive information that cannot be shared with the user based on the user profile may be removed from the one or more web documents. The one or more web documents may be stylized to simulate writing style of the user. The server may present an edited and stylized version of the one or more web documents on the graphical user interface 202.

Figure 3:
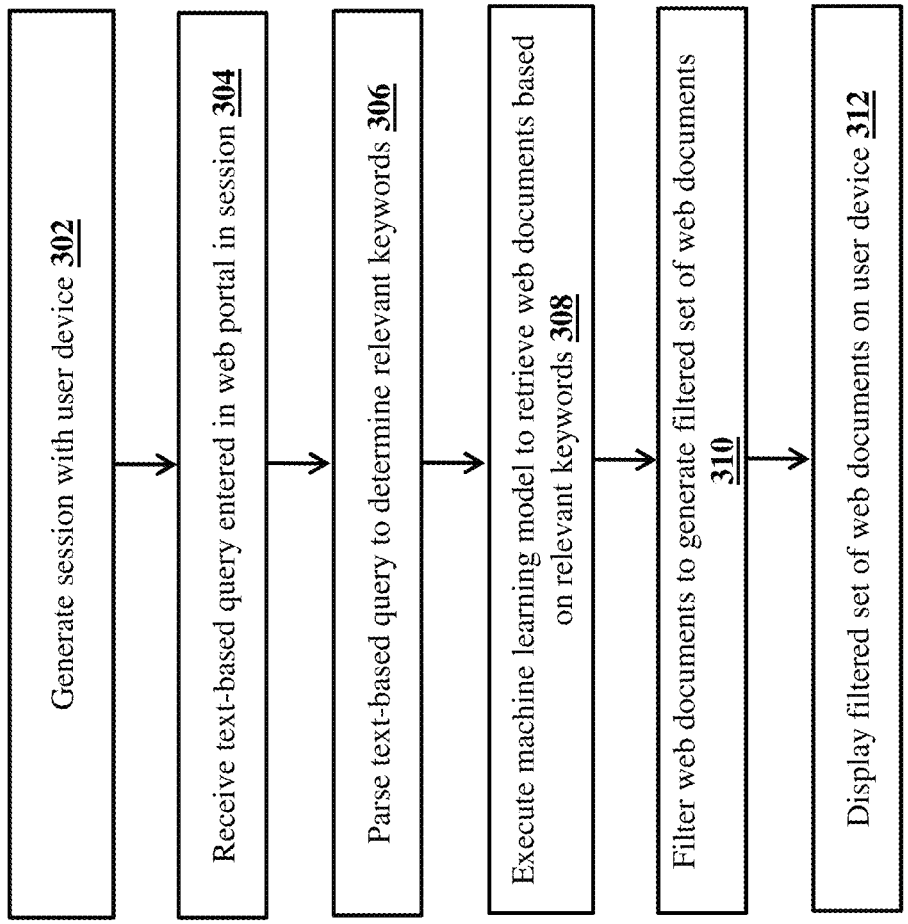
FIG. 3 illustrates a flow diagram of a method for initiating an electronic communication session via a communication application, according to an embodiment.

FIG. 3 shows a flow diagram of an illustrative method 300 of generating a set of filtered set of web documents in response to a query, according to an embodiment. The method 300 shown in the FIG. 3 may include execution steps 302, 304, 306, 308, 310, and 312. However, it should be appreciated that other embodiments may include additional or alternative execution steps, or may omit one or more steps altogether. It should also be appreciated that other embodiments may perform certain execution steps in a different order; steps may also be performed simultaneously or near-simultaneously with one another. In addition, the method 300 of the FIG. 3 is described as being executed by a server operated by a customer assistance center of an enterprise in this embodiment. The server executing one or more steps may be programmed to execute various other, unrelated essential features. The steps may also be executed by a plurality of computing devices operating in a distributed computing environment.

In a first step 302, a user device by a user may communicate with the server to start or establish an electronic communication session. The user device may communicate with the server using a web portal on the user device. The web portal may include a communication application. The user device may communicate with the server via a communication channel associated with the communication application. The communication channel may be a chat bot channel. The chat bot channel may be accessed via virtual assistants via the communication application. In one example, the user may use the user device to contact the server by placing a call or sending a text message via the chat bot channel over a telecommunications network. The server may receive the call or the text message along with a unique device identifier associated with the user device over the telecommunications network.

The chat bot channel may include hardware and software components capable of hosting and relaying data communications transmitted to the server from the user device. Non-limiting examples of the data arriving through the chat bot channel may include voice calls, browser activity on the communication application, short-message service messages (i.e., text messages), images, and interactive voice responses, among others.

When the server accepts the call or the text message received from the user device over the telecommunications network, the electronic communication session between the user device and the server is started. At the start of the electronic communication session, the server may execute one or more authentication algorithms to generate one or more authentication questions for verification of an identity of the user. The authentication question may be a question related to sensitive or non-sensitive information of the user. The server may transmit a credentials prompt containing the one or more authentication questions for performing the authentication of the user to the user device during the electronic communication session. The server may receive answers and authentication credentials for the one or more authentication questions from the user device. After receiving the authentication credentials, the server may match the authentication credentials provided by the user for the one or more authentication questions with authentication credentials to a same set of one or more authentication questions previously provided by the user, which are presently stored in a database. Upon determining that current authentication credentials provided by the user for the one or more authentication questions matches with the previously provided and verified authentication credentials provided by the user for the same set of one or more authentication questions, the server may authenticate the user and the electronic communication session.

In a next step 304, the user may use the communication channel on the communication application to submit a text-based query. The server may receive the text-based query. The virtual assistant associated with the server may be configured to perform tasks for the user based on one or more questions in the text-based query. The one or more questions may include a text input and an image input. The tasks may be to analyze the one or more questions, and search for answers to the one or more questions in the database and other external resources.

In a next step 306, the server may use one or more parsing protocols to parse information within the one or more questions. Based on the parsing, the server may determine one or more relevant keywords from the one or more questions in accordance with one or more predetermined rules. The one or more predetermined rules may include a first rule. According to the first rule, the server may select a particular relevant keyword from the one or more questions based on a number of times the relevant keyword is used in the one or more questions. The one or more predetermined rules may further include a second rule. According to the second rule, the server may select a particular relevant keyword from the one or more questions based on meaning and context of the relevant keyword in the one or more questions. The one or more predetermined rules may further include a third rule. According to the third rule, the server may select a particular relevant keyword from the one or more questions based on a type and technical nature of content in the one or more questions. Upon selecting the one or more relevant keywords from the one or more questions, the server may store a record containing the one or more relevant keywords in the database.

In a next step 308, the server may execute a machine learning model to retrieve one or more web documents from the database based upon the one or more relevant keywords. The one or more web documents may be directly or indirectly associated with the one or more relevant keywords and the one or more questions. The one or more web documents may include solutions to the one or more questions.

The server may train the machine learning model using training dataset. The training dataset may include measurements taken on a sample of a plurality of web documents, a plurality of questions, and a plurality of keywords stored in the database. The database may be continually updated with new supply of the plurality of web documents, the plurality of questions, and the plurality of keywords. The server may retrain the machine learning model using new information in an updated training dataset. The updated training dataset may include new measurements taken on a sample of new materials added in the database.

In a next step 310, the server may filter the one or more web documents to generate a filtered set of web documents based upon the authentication credentials associated with the user. The filtered set of web documents may include a subset of the one or more web documents. The filtered set of web documents may include a redacted version of the one or more web documents.

In one non-limiting example, the authentication credentials associated with the user may indicate that the user does not speak French language. The server may analyze the one or more web documents to identify at least one web document, which may include a first portion in the French language. The server may redact or remove the first portion of the at least one web document. The redacted first portion of the at least one web document may be a text or an image portion. In some instances, the server may convert the first portion of the at least one web document in another language. The server may include redacted version of the at least one web document or translated version of the at least one web document along with other web documents in the filtered set of web documents.

In another non-limiting example, the authentication credentials associated with the user may indicate that the user does not have access to sensitive information. The server may analyze the one or more web documents to identify at least one web document, which may include the sensitive information. The server may remove the sensitive information from the at least one web document. The server may include a redacted version of the at least one web document along with other web documents in the filtered set of web documents.

In a next step 312, the server may display the filtered set of web documents on the user device, in response to the text-based query. In one embodiment, the user device may interact with a web link associated with each of the filtered set of web documents to access information within the filtered set of web documents. In another embodiment, the user device may open each of the filtered set of web documents to access the information within the filtered set of web documents.

In one non-limiting example, a user may use a search engine-based web service of a company on a mobile device to submit a question. A machine learning model associated with the search engine-based web service may process the question and determine a web document from a database, which may be most appropriately related to a topic of the question. The web document may be presented on the user device.

In another non-limiting example, a user may use an artificial intelligence based chat service of a company on a mobile device to submit a question. An intelligent virtual assistant of the artificial intelligence based chat service may process the question and return a web document from a database, which may be most appropriately related to subject matter of the question. The web document may be presented on the user device.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising:
generating, by a server, an authenticated session based upon authentication credentials associated with a user operating a user device, the authentication credentials corresponding to a first level of authentication;
receiving, by the server, a text-based query entered in a web portal in the authenticated session from the user device;
parsing, by the server, the text-based query to determine one or more relevant keywords based upon one or more predetermined rules;
executing, by the server, a machine learning model to retrieve one or more web documents based upon the one or more relevant keywords, wherein the one or more web documents are associated with a plurality of levels of authentication;
filtering, subsequent to receiving the text-based query by the server, the one or more web documents to generate a filtered set of web documents based upon the authentication credentials, wherein the filtering redacts a portion of at least one web document, the portion having a second level of authentication higher than the first level of authentication of the authentication credentials; and displaying, by the server on the user device, the at least one web document having the portion redacted of the filtered set of web documents.

2. The server-implemented method according to claim 1, wherein the web portal comprises an intelligent virtual assistant.

3. The server-implemented method according to claim 2, wherein the intelligent virtual assistant is configured to perform tasks for the user based on analysis of one or more questions in the text-based query.

4. The server-implemented method according to claim 3, wherein the one or more questions comprises a text input, a voice input, and an image input.

5. The server-implemented method according to claim 1, further comprising:
training, by the server, the machine learning model using a training dataset, wherein the training dataset comprises measurements taken on a sample of a plurality of web documents and a plurality of questions stored in a database.

6. The server-implemented method according to claim 1, further comprising:
retraining, by the server, the machine learning model using an updated training dataset, wherein the updated training dataset comprises measurements taken on a sample of a new set of web documents and a new set of questions added in a database.

7. The server-implemented method according to claim 1, wherein the redacted portion of the at least one web document is a text or an image.

8. The server-implemented method according to claim 1, wherein the one or more predetermined rules comprises a rule to select a relevant keyword from the text-based query based on a number of times the relevant keyword is used in the text-based query.

9. The server-implemented method according to claim 1, wherein the one or more predetermined rules comprises a rule to select a relevant keyword from the text-based query based on a meaning and context of the relevant keyword in the text-based query.

10. The server-implemented method according to claim 1, wherein the one or more predetermined rules comprises a rule to select a relevant keyword from the text-based query based on a type of content in the text-based query.

11. A system comprising:
a non-transitory storage medium storing a plurality of web documents; and
a server configured to:
generate an authenticated session based upon authentication credentials associated with a user operating a user device, the authentication credentials corresponding to a first level of authentication;
receive a text-based query entered in a web portal in the authenticated session from the user device;
parse the text-based query to determine one or more relevant keywords based upon one or more predetermined rules;
execute a machine learning model to retrieve one or more web documents from the non-transitory storage medium based upon the one or more relevant keywords, wherein the one or more web documents are associated with a plurality of levels of authentication;
filter, subsequent to receiving the text-based query, the one or more web documents to generate a filtered set of web documents based upon the authentication credentials based upon the authentication credentials, the portion having a second level of authentication higher than the first level of authentication of the authentication credentials; and
provide, for display to the user device, the at least one web document having the portion redacted of the filtered set of web documents.

12. The system according to claim 11, wherein the web portal comprises an intelligent virtual assistant.

13. The system according to claim 12, wherein the intelligent virtual assistant is configured to perform tasks for the user based on analysis of one or more questions in the text-based query.

14. The system according to claim 13, wherein the one or more questions comprises a text input, a voice input, and an image input.

15. The system according to claim 11, wherein the server is configured to train the machine learning model using a training dataset, wherein the training dataset comprises measurements taken on a sample of a plurality of web documents and a plurality of questions stored in a database.

16. The system according to claim 11, wherein the server is configured to retrain the machine learning model using an updated training dataset, wherein the updated training dataset comprises measurements taken on a sample of a new set of web documents and a new set of questions added in a database.

17. The system according to claim 11, wherein the redacted portion of the at least one web document is a text or an image.

18. The system according to claim 11, wherein the one or more predetermined rules comprises a rule to select a relevant keyword from the text-based query based on a number of times the relevant keyword is used in the text-based query.

19. The system according to claim 11, wherein the one or more predetermined rules comprises a rule to select a relevant keyword from the text-based query based on a meaning and context of the relevant keyword in the text-based query.

20. The system according to claim 11, wherein the one or more predetermined rules comprises a rule to select a relevant keyword from the text-based query based on a type of content in the text-based query.

* * * * *